(12) United States Patent
Griswold et al.

(10) Patent No.: US 9,338,105 B2
(45) Date of Patent: May 10, 2016

(54) PROVIDING OVERSUBSCRIPTION OF PIPELINE BANDWIDTH

(71) Applicant: BROADCOM CORPORATION, Irvine, CA (US)

(72) Inventors: Mark David Griswold, Fremont, CA (US); Mohammad Kamel Issa, Los Altos, CA (US); Mohan Venkatachar Kalkunte, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 165 days.

(21) Appl. No.: 14/028,471

(22) Filed: Sep. 16, 2013

(65) Prior Publication Data

US 2015/0063367 A1 Mar. 5, 2015

Related U.S. Application Data

(60) Provisional application No. 61/873,272, filed on Sep. 3, 2013.

(51) Int. Cl.
*H04L 12/861* (2013.01)

(52) U.S. Cl.
CPC ........ *H04L 49/9057* (2013.01); *H04L 49/9063* (2013.01)

(58) Field of Classification Search
None
See application file for complete search history.

(56) References Cited

U.S. PATENT DOCUMENTS

| | | | |
|---|---|---|---|
| 6,625,650 B2 * | 9/2003 | Stelliga | 709/226 |
| 6,714,553 B1 * | 3/2004 | Poole | H04L 12/4625 370/412 |
| 6,952,738 B1 * | 10/2005 | Gaudet | 709/231 |
| 7,209,482 B1 * | 4/2007 | Rahim | H04L 47/10 370/230 |
| 2002/0039350 A1 * | 4/2002 | Wang et al. | 370/230.1 |
| 2006/0114914 A1 * | 6/2006 | Anand et al. | 370/395.53 |
| 2006/0268913 A1 * | 11/2006 | Singh | H04L 49/90 370/412 |
| 2009/0097495 A1 * | 4/2009 | Palacharla et al. | 370/413 |
| 2014/0079076 A1 * | 3/2014 | Kamble | H04L 1/0083 370/474 |
| 2014/0160935 A1 * | 6/2014 | Zecharia et al. | 370/235 |

* cited by examiner

*Primary Examiner* — Faruk Hamza
*Assistant Examiner* — Cassandra Decker
(74) *Attorney, Agent, or Firm* — McDermott Will & Emery LLP

(57) ABSTRACT

A system for providing oversubscription of pipeline bandwidth comprises a steer module, an absorption buffer, an ingress packet processor (IPP), a memory management unit (MMU), and a main packet buffer. The steer module receives packets that include start of packet (SOP), middle of packet (MOP), and end of packet (EOP) cells, attaches a packet identifier to the cells, passes the MOP and EOP cells to the MMU, and stores the SOP cells and EOP metadata in the absorption buffer. The IPP processes the SOP cells and EOP metadata and passes the same to the MMU. The MMU stores the MOP, EOP, and processed SOP cells in the main packet buffer, combines, upon receiving the processed EOP metadata of each packet, the processed SOP cell, the MOP cells and the EOP cell of each packet to reconstruct each packet, and queues each reconstructed packet in an egress port queue.

20 Claims, 10 Drawing Sheets

PROVIDING OVERSUBSCRIPTION OF PIPELINE BANDWIDTH

CROSS-REFERENCE TO RELATED APPLICATIONS

The present application claims the benefit of U.S. Provisional Patent Application Ser. No. 61/873,272, entitled "Providing Oversubscription of Pipeline Bandwidth," filed on Sep. 3, 2013, which is hereby incorporated by reference in its entirety for all purposes.

TECHNICAL FIELD

The present description relates generally to pipeline bandwidth, and more particularly, but not exclusively, to providing for oversubscription of pipeline bandwidth in a switch.

BACKGROUND

High-performance computing applications, and other similar applications, may benefit from increasing the size of interconnection networks, such as by increasing the number of ports supported by switch devices in an interconnection network and/or by increasing the speed of such ports. Increasing the number of ports, and/or the speed of such ports, may require additional packet processing bandwidth in the switch devices, and additional bandwidth to the memory subsystem of the switch devices, e.g. such that the switch devices have adequate throughput to handle the aggregate data rate of incoming packets.

However, many of the applications supported by the switch devices may benefit more from additional throughput of the switch processing pipeline than from additional packet processing. The switch devices may be able to achieve additional throughput of the switch processing pipeline by allowing more attached bandwidth than the throughput of the packet processing pipeline. For example, a switch device may include an absorption buffer before the packet processing pipeline to absorb incoming packets, e.g. when the processing packet pipeline bandwidth is fully subscribed. However, the inclusion of an additional buffer may add cost to the switch device and the additional buffer may also consume area and power. In addition, the size of the packets received by the switch device may vary. Therefore one or more large packets may completely fill the absorption buffer, which would prevent additional packets from being buffered and thereby detrimentally impacting throughput.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for providing oversubscription of pipeline bandwidth in a switch device, an absorption buffer placed before the packet processing pipeline is configured to store a summary of each received packet, e.g. a start of packet (SOP) cell of a packet and end of packet (EOP) metadata extracted from one or more cells of the packet, rather than the entirety of each received packet, while the remainder of each packet is passed to the memory management unit (MMU) to be stored in a main packet buffer. In one or more implementations, the combination of the SOP cell of the packet and the EOP metadata may be referred to as a packet summary. After the remainder of the packet has been passed to the MMU, and the SOP cell and EOP metadata have been processed by the ingress packet processor and passed to the MMU, the SOP cell and the remainder of the packet may be recombined and queued in a unicast or multicast queue corresponding to an egress port. Thus, only a small amount of data needs to be stored in the absorption buffer for each packet, rather than the entirety of each packet, thereby allowing for a larger number of packets to be handled by the switch device, irrespective of packet size, when the packet processing pipeline bandwidth of the switch device is oversubscribed. In this manner, the subject system maximizes throughput while providing lossless service with a minimal absorption buffer. Furthermore, the subject system allows for utilization of the main packet buffer as the headroom buffer for lossless service, thereby enabling more lossless services, e.g. as many as the main packet buffer can service.

Figure 1:
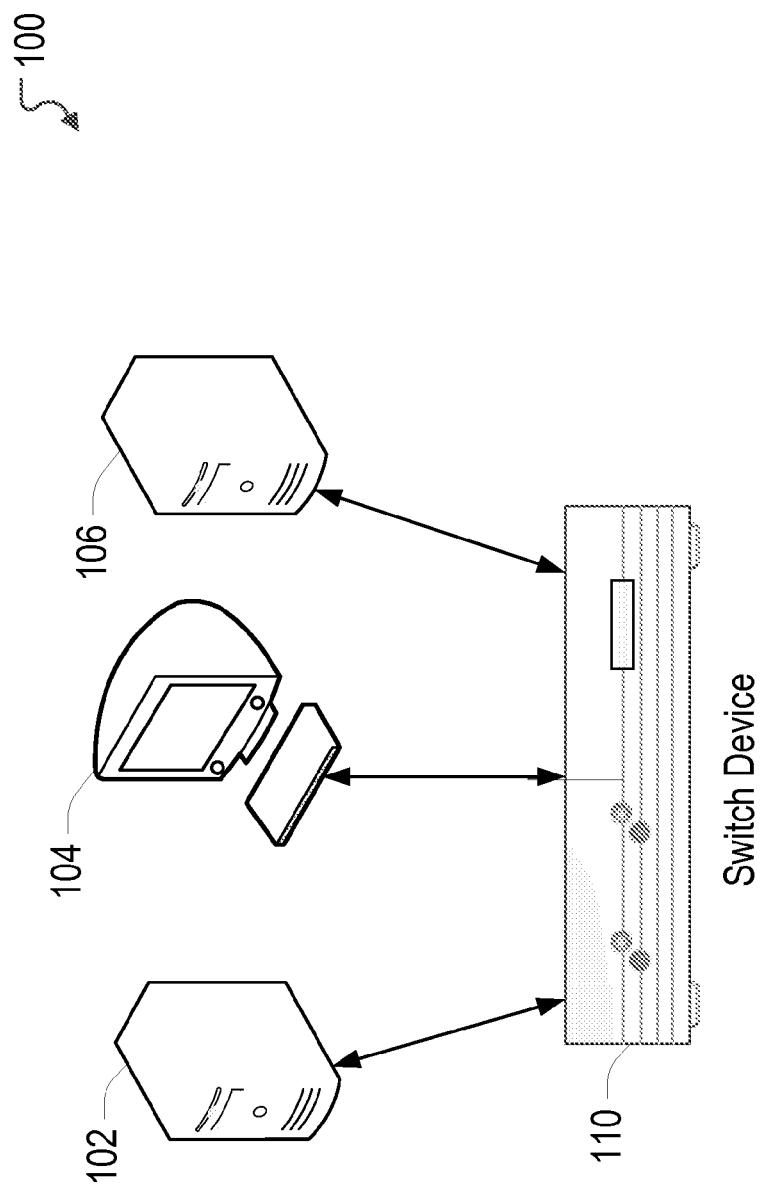
FIG. 1 illustrates an example network environment in which a system for providing oversubscription of pipeline bandwidth may be implemented in accordance with one or more implementations.

FIG. 1 illustrates an example network environment 100 in which a system for providing oversubscription of pipeline bandwidth may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 may include various electronic devices 102, 104, 106, such as one or more servers, computers, network components, network devices, etc. In one or more implementations, the network environment 100 may include a set of servers, a server bank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as the switch device 110, may be implemented to facilitate communication between the one or more electronic devices 102, 104, 106 of the network environment 100. The electronic devices 102, 104, 106 of the network environment 100, may be connected or otherwise in communication with each other, through or using the switch device 110. For example, the electronic devices 102, 104, 106 may each be coupled to a physical port of the switch device 110 by a network transmission line, such as an Ethernet transmission line, a coaxial transmission line, an optical transmission line, or generally any transmission line. In one or more implementations, one or more of the electronic devices 102, 104, 106 may be wirelessly coupled to the switch device 110.

The electronic devices 102, 104, 106 transmit packets to the switch device 110 at an aggregate data rate and the switch device 110 is configured to handle/route packets at a throughput rate. If the aggregate data rate of the electronic devices 102, 104, 106 is substantially equivalent to the throughput rate of the switch device 110, the pipeline bandwidth of the switch device 110 may be fully subscribed, e.g. any increase in bandwidth by the electronic devices 102, 104, 106 may result in packet loss. However, in accordance with the system described herein, the switch device 110 may be configured to handle packets received at an aggregate data rate that exceeds the throughput rate of the switch device 110, without causing packet loss. Thus, the pipeline bandwidth of the switch device 110 may be oversubscribed, e.g. the aggregate data rate of the electronic devices 102, 104, 106 may exceed the throughput rate of the switch device 110.

Figure 2:
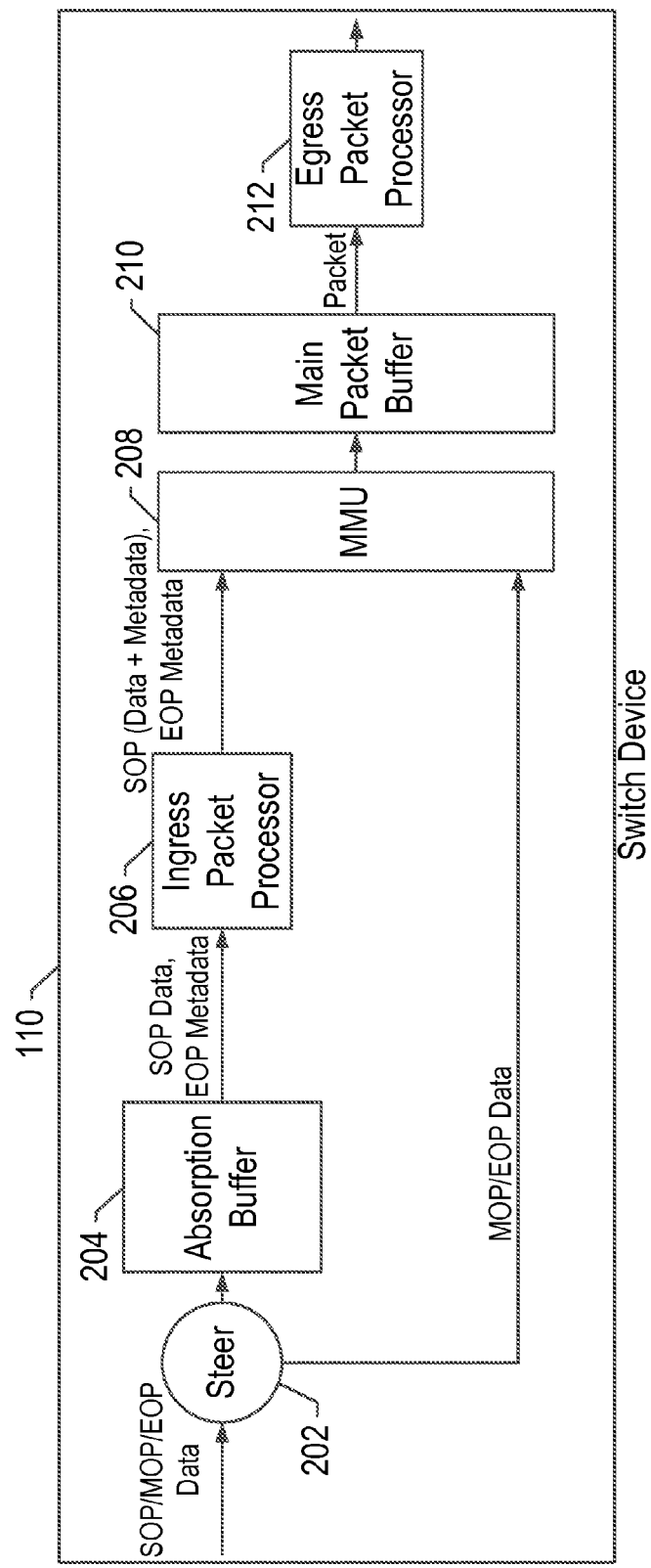
FIG. 2 illustrates an example switch device that may implement a system for providing oversubscription of pipeline bandwidth in accordance with one or more implementations.

FIG. 2 illustrates an example switch device 110 that may implement a system for providing oversubscription of pipeline bandwidth in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The switch device 110 includes a steer module 202, an absorption buffer 204, an ingress packet processor 206, a memory management unit (MMU) 208, a main packet buffer 210, and an egress packet processor 212. In one or more implementations, the steer module 202 may be, or may include, appropriate circuitry for performing the operations discussed herein. The switch device 110 may further include, or may be associated with, one or more physical ports. The ports may be internal on a single chip or die, or the ports may be spread across multiple chips or dies. The switch device 110 may further include an interconnect that may facilitate routing data through the switch device 110. In one or more implementations, the interconnect may include, or may be, a fabric, such as a full mesh fabric, or any other interconnect. The absorption buffer 204 may be a shared packet buffer for a group of ports, or a per port first-in-first-out (FIFO) packet buffer. The size of the absorption buffer 204 may be area dependent.

Data packets may arrive at, or be received at or through, a physical port of the switch device 110 that may logically be referred to as an ingress port, and data packets may depart from the switch device 110 at or through a physical port that may be logically referred to as an egress port. Thus, a physical port may be logically referred to as both an ingress port, when data is being received at or through the port, and an egress port, when data is being transmitted at or through the port. Thus, for explanatory purposes the switch device 110 is shown in an unfolded view in FIG. 2 to illustrate the packet processing pipeline of the switch, with data entering the switch device 110 on the left and departing the switch device 110 on the right. However, in one or more physical implementations of the switch device 110, one or more of the physical ports may be used for receiving and/or transmitting packets.

In one or more implementations, the packets received by the switch device 110 may be large, and may arrive and/or be processed in smaller pieces (referred to in one or more implementations as "cells," "segments," "chunks," or "portions"). For example, the switch device 110 may separate a received packet into cells, including a start of packet (SOP) cell, which includes the start of the packet, middle of packet (MOP) cells, which include the middle of the packet, and an end of packet (EOP) cell, which includes the end of the packet. In the instance that a packet only includes one cell, then the SOP cell would also be the EOP cell. The cells may each include an identifier of the ingress port over which the cells (or corresponding packet) were received.

In operation, the cells of the packets are passed to the steer module 202 that is located before the absorption buffer 204 and the MMU 208. The steer module 202 may determine whether the cells should be buffered in the absorption buffer 204, in the case of SOP cells and metadata extracted from cells, or passed to the MMU 208 for storage in the main packet buffer 210, in the case of middle of packet (MOP) and EOP cells. Copies of one or more of the cells (or metadata extracted from one or more of the cells) may be passed to the absorption buffer 204 for the purpose of extracting metadata from the cells, e.g. packet length, for ingress packet processing by the ingress packet processor 206. The steer module 202 also may allocate a packet identifier, e.g. a unique tag, for each packet received over each ingress port, and may attach the packet identifier to each cell of each packet. In one or more implementations, the unique tag and an identifier of the ingress port may be included in the metadata extracted from one or more cells and stored in the absorption buffer 204.

The steer module 202 may utilize a look-up table, or other data structure, to associate an identifier of each ingress port with the packet identifier of the packet currently being received over the ingress port. For example, when the steer module 202 receives an SOP cell of a packet, e.g. the first cell of the packet, the steer module 202 may generate and/or allocate a packet identifier for the packet, and may store an association in a lookup table between the allocated packet identifier and an ingress port identifier included in the SOP cell. Thus, when the steer module 202 receives a non-SOP cell, e.g. an MOP cell or an EOP cell, the steer module 202 performs a lookup based on the ingress port identifier included in the non-SOP cell to retrieve the packet identifier of the packet corresponding to the non-SOP cell.

Since the MOP and EOP cells of a packet are passed from the steer module 202 to the MMU 208 before the destination of the packet is determinable by the MMU 208, the MMU 208 cannot check congestion at the destination (egress) port and/or perform other destination based policies. Thus, the main packet buffer 210 may logically include a separate partition, e.g. an oversubscription partition, that is used to account for storage of the MOP and EOP cells that are received by the MMU 208, where a main partition is used to account for storage of packets and/or other data in the main packet buffer 210. The size of the oversubscription partition may be configurable and/or dynamic, e.g. based on the number of active ingress ports. When the MOP and EOP cells arrive at the MMU 208, the MMU 208 may perform an input thresholds check to determine whether the main packet buffer 210 has adequate memory space for storage of the cells, and an output thresholds check to determine whether the oversubscription partition can account for the storage of the cells. In one or more implementations, the input thresholds check may determine whether the main packet buffer 210 is being divided fairly amount source ports and related entities, e.g. source port/priority, ingress pool, etc.

If the main packet buffer 210 has adequate memory space for the cells and the oversubscription partition can account for the storage of the cells, a cell pointer and a location in the main packet buffer 210 may be allocated for each cell, and each cell, including the associated packet identifier, may then be written to the allocated location. In one or more implementations, the MOP and EOP cells may be stored in a single shared pool of buffers, or any other data storage and/or data structure. The MMU 208 may generate flow control assertions for lossless traffic based on the input thresholds, e.g. as the main packet buffer 210 is reaching its capacity.

Since the first non-SOP cell of a packet may arrive at the MMU 208 before the SOP cell of the packet arrives at the MMU 208, the MMU 208 performs an input thresholds check to determine whether the main packet buffer 210 has adequate memory space for two cells, itself and the SOP cell of the packet, and the MMU 208 performs an output thresholds check to determine whether the oversubscription partition can account for the storage of the two cells. When the SOP cell arrives at the MMU 208, it can then be stored in the main packet buffer 210 without the MMU 208 performing an input thresholds check or an output thresholds check. However, if the SOP cell of a packet arrives before the first non-SOP cell of the packet, then the SOP cell is stored in memory space that is not accounted for until the first non-SOP cell arrives, e.g. effectively a memory space IOU. However, since only one SOP cell will be received by the MMU 208 for any given ingress port before the first non-SOP cell for the ingress port is received by the MMU 208, the main packet buffer 210 and the oversubscription partition can be appropriately sized to account for memory space for one extra SOP cell for each ingress port.

If the packet is a single-cell packet, the MMU 208 may perform an input thresholds check for one cell, e.g. the entire packet, when the EOP cell arrives. In one or more implementations, the EOP cell of a single-cell packet may not be written to the main packet buffer 210 until the SOP cell is processed. In one or more implementations, the main packet buffer 210 may include any number of partitions for accounting for storage of the cells and/or the packets, such as one, two, three, etc.

As the MOP and EOP cells of a packet are written to the main packet buffer 210, a data structure is created that associates the cells of the packet in the order that they are received by the MMU 208. For example, the data structure may be a linked list, e.g. a cell linked list, that links the pointers of each non-SOP cell in the order that they are received by the MMU 208. In one or more implementations, the cells may be stored in sequential memory addresses, e.g. in the order that the cells are received. When the SOP cell is written to the main packet buffer 210, a pointer to the SOP cell, and information for routing the packet, such as egress port, are stored in a SOP table. Since at most one SOP cell per ingress port will be stored in the main packet buffer 210 until the corresponding EOP metadata is processed by the ingress packet processor 206, the SOP table may be indexed by the identifier of the corresponding ingress port.

When the EOP metadata is processed by the ingress packet processor 206 and arrives at the MMU 208, e.g. including the packet identifier of the packet and the identifier of the ingress port over which the packet was received, the packet can be reconstructed by the MMU 208. For example, the pointer to the SOP cell may be retrieved from the SOP table based on the ingress port identifier included with the EOP cell, and the pointer to the first non-SOP cell can be retrieved based on the packet identifier associated with the EOP cell. The cell linked list, or other ordered association of the MOP cells, can then be used to reconstruct the MOP cells in the order that they were received. The MMU 208 may then perform an output thresholds check and/or other congestion checks, e.g. once per packet for the main partition, before queuing the packet in one or more queues of the main packet buffer 210 that are associated with one or more egress ports. In one or more implementations, the output thresholds check may check whether the main packet buffer 210 is being divided fairly among destination ports and related entities (e.g. queue, port, port/service pool, egress pool, etc.) The MMU 208 may account for storage of the queued packet against the main partition of the main packet buffer 210, and the MMU 208 may free the memory accounted against the oversubscription partition for the cells of the packet. The packet may be subsequently retrieved from the main packet buffer 210, processed by the egress packet processor 212, and transmitted over one or more egress ports.

As shown in FIG. 2, the cells arrive at the steer module 202 at an oversubscribed rate, e.g. a rate that is higher than the throughput rate of the packet processing pipeline. The steer module 202 passes the MOP/EOP cells to the MMU 208 and the steer module 202 passes the SOP cells and the EOP metadata to the absorption buffer 204. Thus, the absorption buffer 204 allows the packet processing pipeline of the switch device 110 to be oversubscribed.

In one or more implementations, the absorption buffer 204 may utilize a flow control mechanism, e.g. when providing lossless service. For example, when the absorption buffer 204 reaches a transmit off (XOFF) threshold, e.g. per class of service, the absorption buffer 204 may transmit a message, such as a PAUSE or priority flow control message, to a link partner that indicates that packet transmission should be paused. Although packets in-flight may be large or small packets, because the absorption buffer 204 stores substantially fixed-size packet summaries, e.g. an SOP cell and EOP metadata, the burst absorption is independent of the size of the packets. Thus, appropriate transmit on (XON) and XOFF thresholds can be determined to maximize the throughput of the switch device 110.

Figure 3:
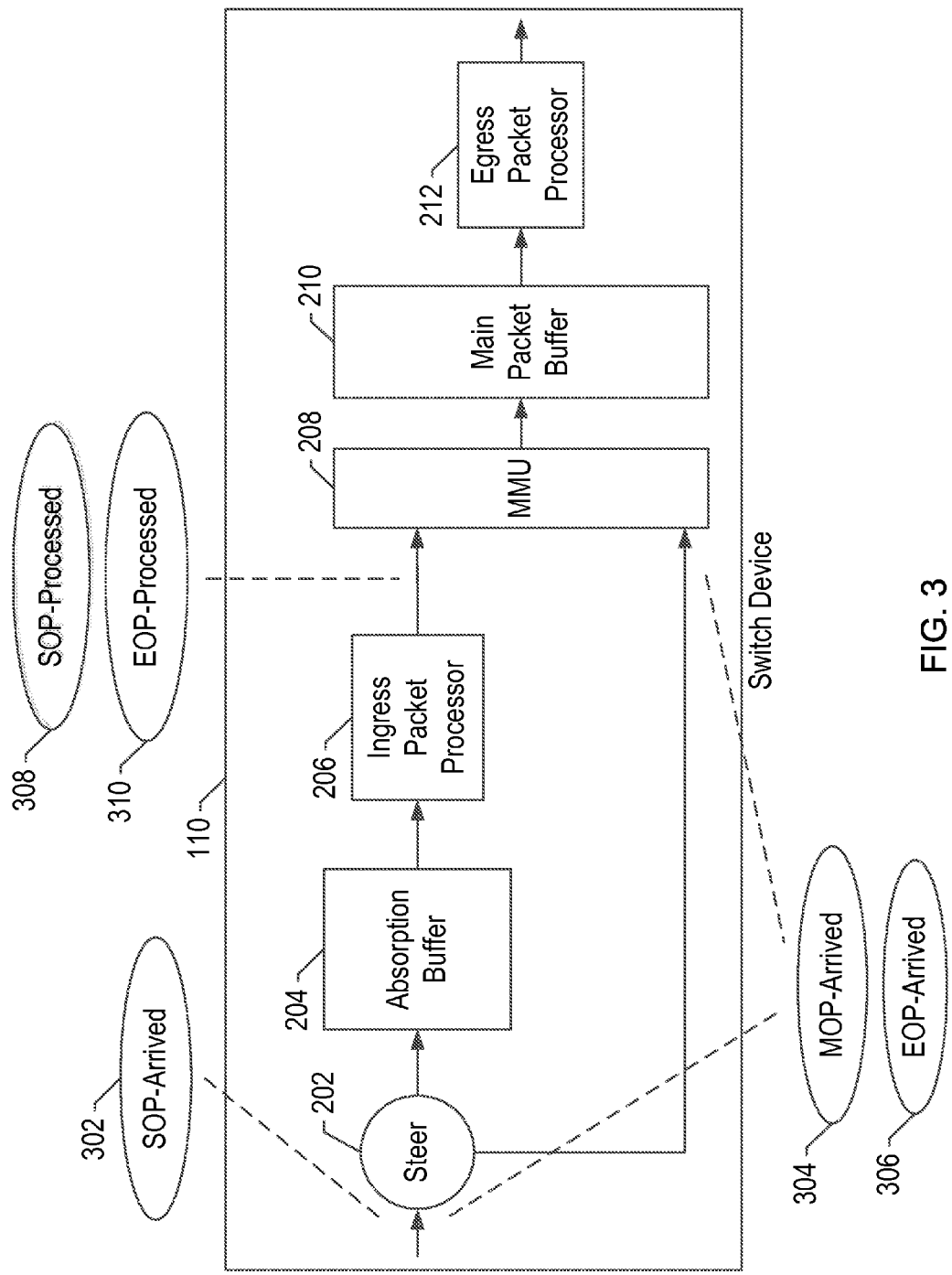
FIG. 3 illustrates example timing events in an example switch device implementing a system for providing oversubscription of pipeline bandwidth in accordance with one or more implementations.

FIG. 3 illustrates example timing events in an example switch device 110 implementing a system for providing oversubscription of pipeline bandwidth in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The timing events in the switch device 110 include an SOP-arrived event 302, an MOP-arrived event 304, an EOP-arrived event 306, an SOP-processed event 308, and an EOP-processed event 310. The timing events may be used to initiate one or more operations of the subject system, as is discussed further below with respect to FIG. 4.

The SOP-arrived event 302 may be triggered by the steer module 202 when an SOP cell arrives at the steer module 202 and/or by the absorption buffer 204 when an SOP cell arrives at the absorption buffer 204. The MOP-arrived event 304 may be triggered by the steer module 202 when an MOP cell arrives at the steer module 202 and/or by the MMU 208 when an MOP cell arrives at the MMU 208. Similarly, the EOP-arrived event 306 may be triggered by the steer module 202 when an MOP cell arrives at the steer module 202 and/or by the MMU 208 when an MOP cell arrives at the MMU 208. The SOP-processed event 308 may be triggered by the ingress packet processor 206 after processing an SOP cell received from the absorption buffer 204 and/or by the MMU 208 upon receiving an SOP cell that was processed by the ingress packet processor 206. The EOP-processed event 310 may be triggered by the ingress packet processor 206 after processing EOP metadata received from the absorption buffer 204 and/or by the MMU 208 upon receiving EOP metadata from the ingress packet processor 206. Thus, the EOP-processed event 310 is generated, at most, once per received packet.

Figure 4:
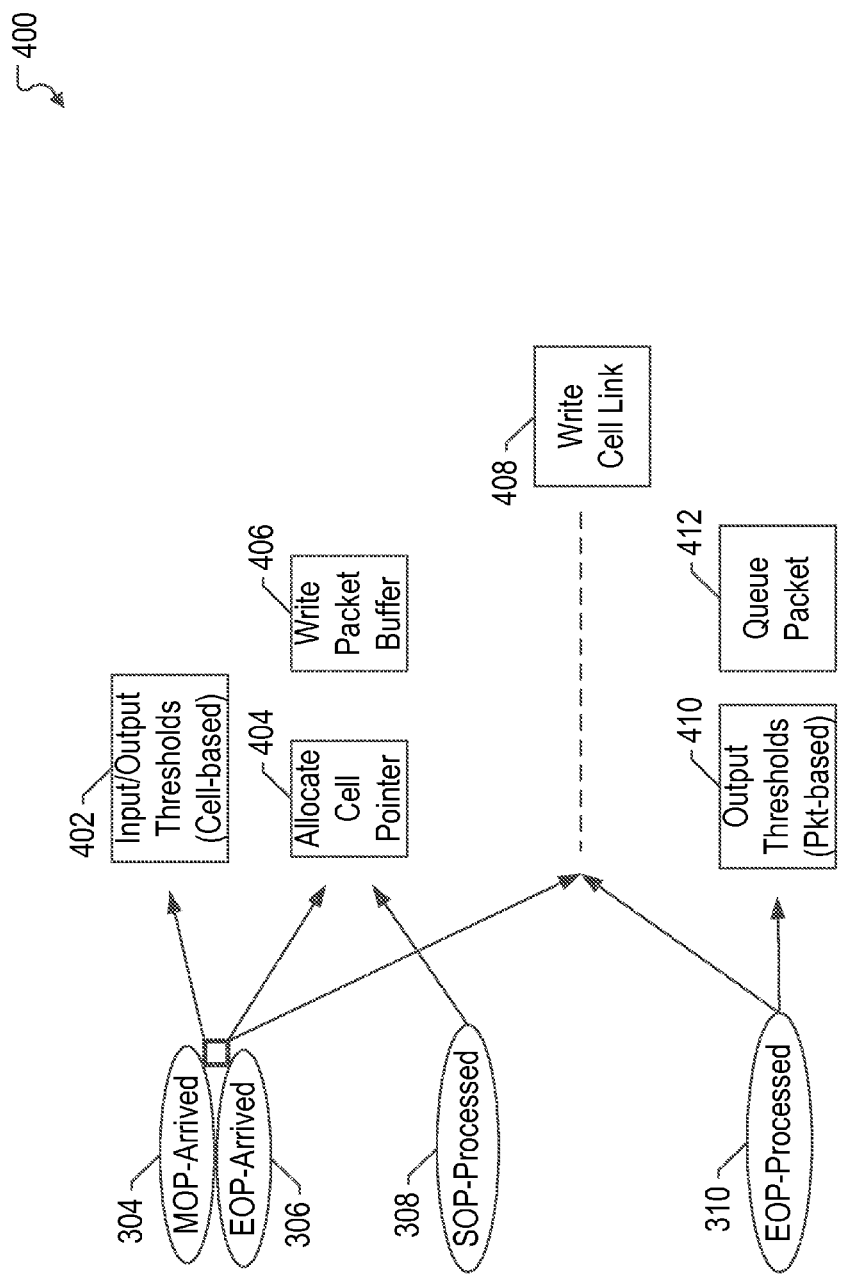
FIG. 4 illustrates an example mapping of timing events to operations in a system for providing oversubscription of pipeline bandwidth in accordance with one or more implementations.

FIG. 4 illustrates an example mapping of timing events to operations 400 in a system for providing oversubscription of pipeline bandwidth in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example mapping of timing events to operations 400 includes operations 402, 404, 406, 408, 410, 412 that are performed by the MMU 208 when a mapped event 304, 306, 308, 310 is triggered. An input thresholds check and output thresholds check operation 402 is mapped to the MOP-arrived event 304 and the EOP-arrived event 306. Thus, when an MOP or EOP cell arrive at the MMU 208, and the MOP-arrived event 304 and/or the EOP-arrived event 306 are triggered, the MMU 208 performs an input thresholds check, e.g. with respect to the main packet buffer 210, and an output thresholds check, e.g. with respect to the oversubscription partition.

An allocate cell pointer operation 404 and a write packet buffer operation 406 are mapped to the MOP-arrived event 304, the EOP-arrived event 306, and the SOP-processed event 308. Thus, when an MOP or EOP cell arrive at the MMU 208, or when an SOP cell is processed by the ingress packet processor 206 and/or received by the MMU 208, and the MOP-arrived event 304, EOP-arrived event 306, and/or the SOP-processed event 308 are triggered, the MMU 208 allocates a cell pointer for the cell and writes the cell to the main packet buffer 210.

A write cell link operation 408 is mapped to the MOP-arrived event 304, the EOP-arrived event 306, and the EOP-processed event 310. Thus, when an MOP or EOP cell of a packet arrive at the MMU 208, and the MOP-arrived event 304 and/or EOP-arrived event 306 is triggered, the MMU 208 stores an association between the MOP or EOP cell and the other cells of the packet, e.g. in a cell link table. Similarly, when EOP metadata of a packet is processed by ingress packet processor 206 and/or received by the MMU 208, and the EOP-processed event 310 is triggered, the MMU 208 associates the SOP cell of the packet with the remainder of the packet, e.g. the MOP and/or EOP cells of the packet, to reconstruct the packet.

An output thresholds check operation 410 and a queue packet operation 412 are mapped to the EOP-processed event 310. Thus, when EOP metadata of a packet is processed by the ingress packet processor 206 and/or received by the MMU 208, and the EOP-processed event 310 is triggered, the MMU 208 performs an output thresholds check for the entire packet, e.g. with respect to a main partition of the main packet buffer 210, the MMU 208 releases space for the packet from the oversubscription partition irrespective of the result of the output thresholds check, and the MMU 208 queues the packet in a queue associated with an egress port, if the main partition has available space for the packet. If the main partition of the main packet buffer 210 does not have space for the packet, the MMU 208 releases space for the packet from the oversubscription partition, and the packet is dropped.

In one or more implementations, a received packet may be a single-cell packet, in which case there will be no MOP-arrived event 304 for the packet, the SOP-arrived event 302 and the EOP-arrived event 306 are coincident, and the SOP-processed event 308 and the EOP-processed event 310 are coincident. Since there is only one cell for the packet, the MMU 208 does not need to associate the SOP cell with the remainder of the packet, as the packet only includes one cell.

Figure 5:
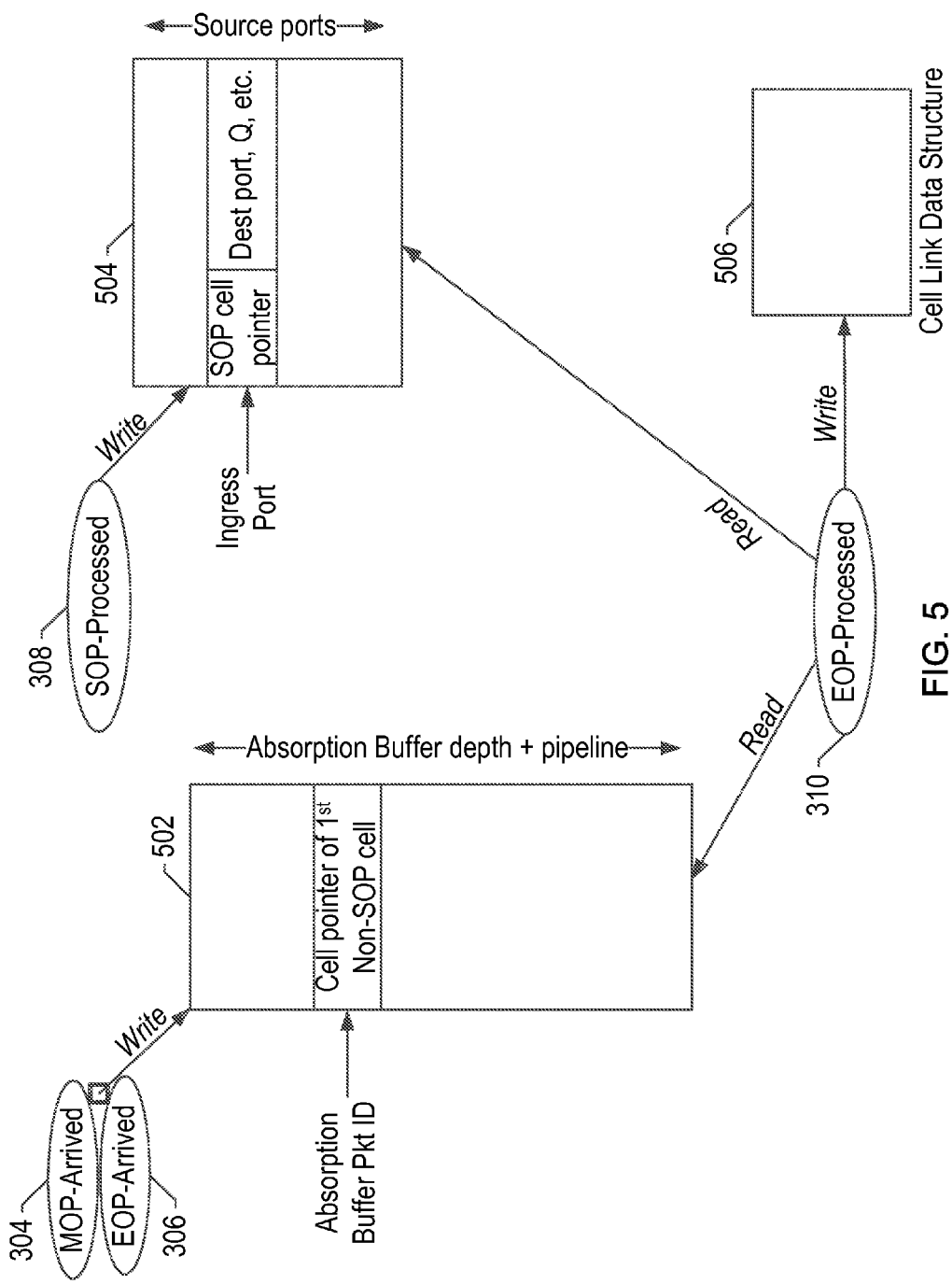
FIG. 5 illustrates example data structures in a system for providing oversubscription of pipeline bandwidth in accordance with one or more implementations.

FIG. 5 illustrates example data structures in a system for providing oversubscription of pipeline bandwidth in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

FIG. 5 includes a MOP/EOP data structure 502, an SOP data structure 504, and a cell link data structure 506 that may be stored in, and/or part of, the main packet buffer 210. The MMU 208 writes pointers to the MOP and EOP cells in the MOP/EOP data structure 502, e.g. when the MOP-arrived event 304 and/or the EOP-arrived event 306 are triggered. The MOP and EOP cell pointers may be stored in the MOP/EOP data structure 502 with an association to the packet identifier attached to the MOP and EOP cells, e.g. as attached by the steer module 202. Thus, in one or more implementations, such as implementations that utilize a table-like data structure for the MOP/EOP data structure 502, all of the MOP cell pointers, and the EOP cell pointer, of a packet can be retrieved using the identifier of the packet. The MOP/EOP data structure 502 may be allocated space based at least in part on the absorption buffer depth and the pipeline.

The MMU 208 writes SOP cell pointers, and metadata associated with processing/routing the packet, such as destination port, etc., to the SOP data structure 504, e.g. when the SOP-processed event 308 is triggered. The SOP cell pointer and metadata may be stored in the SOP data structure 504 with an association to the ingress port, or source port, identifier, e.g. as attached to the SOP cell. The SOP data structure 504 may be allocated space such that the SOP data structure 504 can store an entry, e.g. a cell pointer and metadata, for each ingress port.

The MMU 208 reads MOP and/or EOP cell pointers for a packet from the MOP/EOP data structure 502, and the SOP cell pointer and metadata from the SOP data structure 504, e.g. when the EOP-processed event 310 is triggered. For example, the MMU 208 may use the packet identifier attached to the EOP metadata that triggered the EOP-processed event 310 to retrieve the MOP and/or EOP cell pointers for the packet. Similarly, the MMU 208 may use the ingress port identifier attached to the EOP metadata to retrieve the SOP cell pointer and metadata for the packet. In one or more implementations, the MMU 208 may store the ordered SOP, MOP, and EOP cell pointers of the packet in the cell link data structure 506. The MMU 208 may then use the cell link data structure 506 to reconstruct the packet, e.g. based on the ordered SOP, MOP, and EOP cell pointers.

Figure 6:
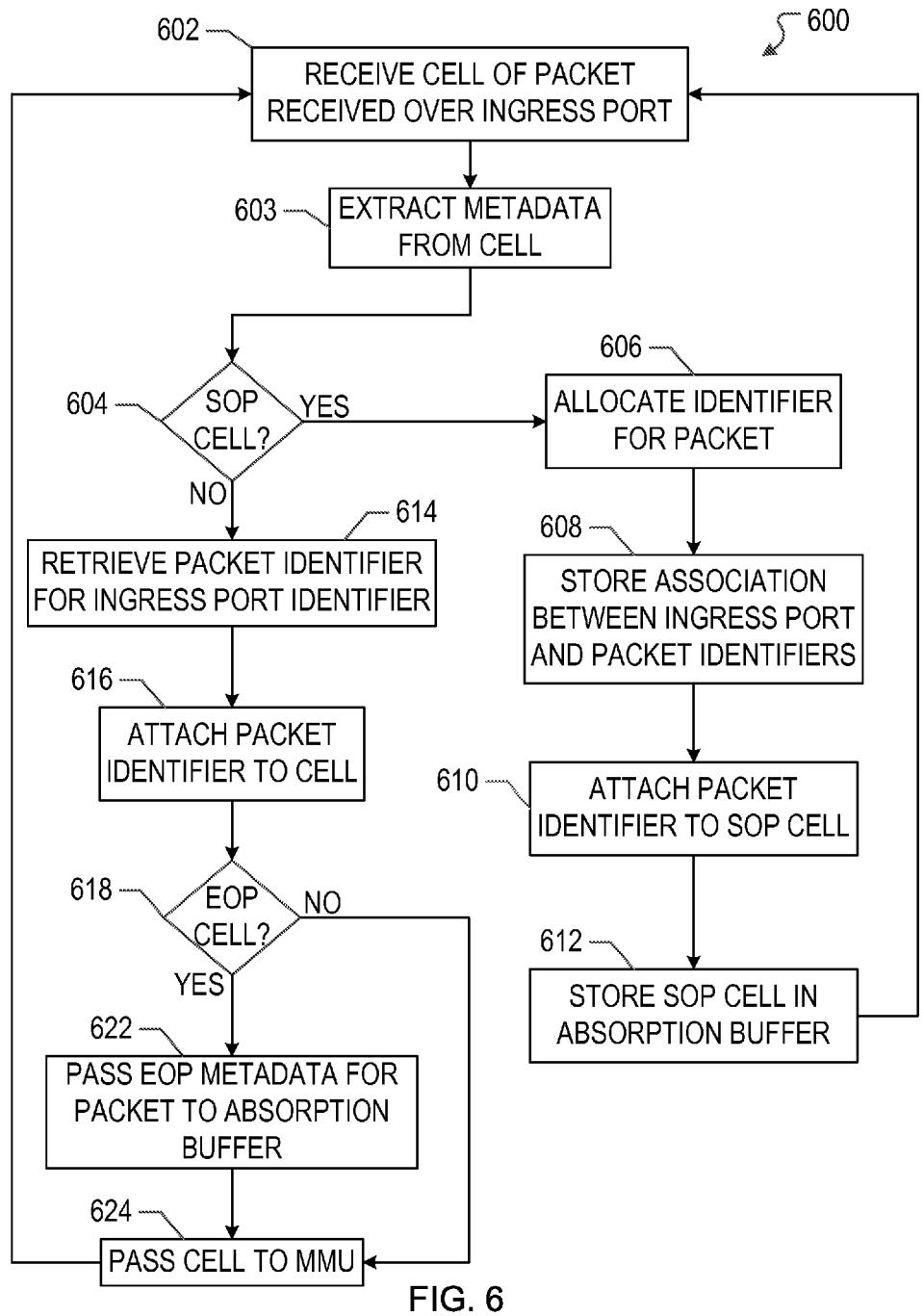
FIG. 6 illustrates a flow diagram of an example process of an example steer module in a system for providing oversubscription of pipeline bandwidth in accordance with one or more implementations.

FIG. 6 illustrates a flow diagram of an example process 600 of an example steer module 202 in a system for providing oversubscription of pipeline bandwidth in accordance with one or more implementations. For explanatory purposes, the example process 600 is described herein with reference to the steer module 202 of the example switch device 110 of FIGS. 2 and 3; however, the example process 600 is not limited to the steer module 202 of the example switch device 110 of FIGS. 2 and 3, and the example process 600 may be performed by one or more components of the example switch device 110. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The steer module 202 receives a cell of a packet that was received over an ingress port (602). In one or more implementations, the received cell may include an identifier of the ingress port over which the corresponding packet (or the cell) was received. In one or more implementations, the steer module 202 may extract metadata), such as packet length, ingress port identifier and packet identifier, from the cell (603) and may pass the metadata to the absorption buffer 204, or the steer module 202 may aggregate metadata from multiple cells of a packet and may pass the metadata to the absorption buffer 204 upon receiving the EOP cell for the packet (622). In one or more implementations, the steer module 202 may pass a copy of the cell to the absorption buffer 204 and the absorption buffer 204 may extract metadata from the cell.

The steer module 202 determines whether the cell is an SOP cell (604). If the cell is an SOP cell (604), the steer module 202 allocates an identifier for the packet (606) and stores an association between the ingress port identifier, e.g. as attached to the SOP cell, and the identifier of the packet (608). For example, the steer module 202 may store the ingress port identifier and the packet identifier in a lookup table. The steer module 202 attaches the packet identifier to the SOP cell (610), stores the SOP cell in the absorption buffer 204 (612), and receives the next cell (602).

If the steer module 202 determines that the received cell is not an SOP cell (604), the steer module 202 retrieves the packet identifier associated with the ingress port identifier attached to the cell (614). For example, the steer module 202 may perform a lookup operation based on the ingress port identifier attached to the cell. The steer module 202 attaches the packet identifier to the cell (616) and determines whether the cell is an EOP cell (618). If the steer module 202 determines that the cell is not an EOP cell (618), the steer module 202 passes the cell to the MMU 208 (624), e.g. bypassing the absorption buffer 204 and the ingress packet processor 206. If the steer module 202 determines that the cell is an EOP cell (618), the steer module 202 passes the EOP metadata for the packet to the absorption buffer 204 (622), if the steer module 202 has been aggregating the EOP metadata for the packet. The EOP metadata may be stored in the absorption buffer 204 with the corresponding SOP cell (622), e.g. based on the ingress port identifier. The steer module 202 then passes the EOP cell to the MMU 208 (624), e.g. bypassing the absorption buffer 204 and the ingress packet processor 206. The steer module 202 then receives the next cell.

Figure 7:
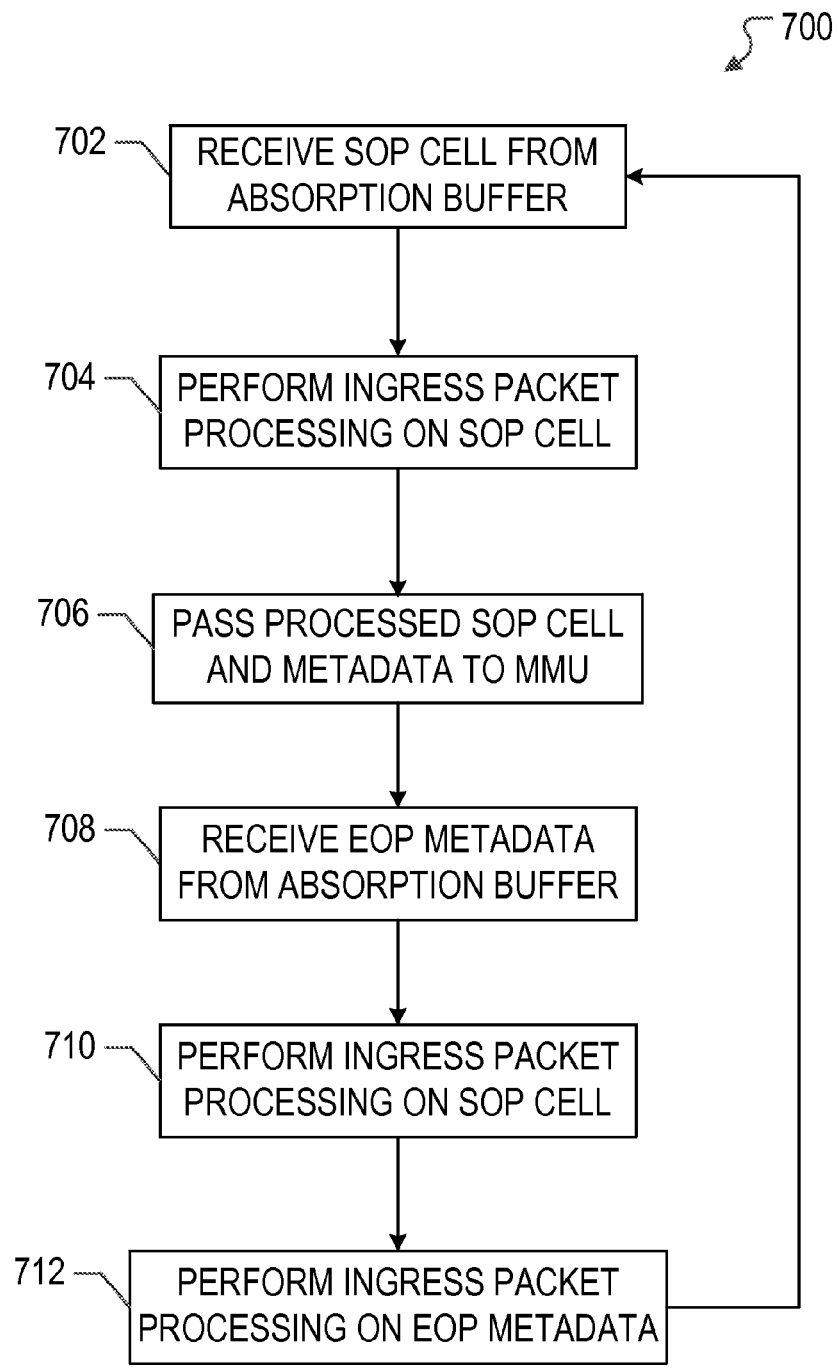
FIG. 7 illustrates a flow diagram of an example process of an example ingress packet processor in a system for providing oversubscription of pipeline bandwidth in accordance with one or more implementations.

FIG. 7 illustrates a flow diagram of an example process 700 of an example ingress packet processor 206 in a system for providing oversubscription of pipeline bandwidth in accordance with one or more implementations. For explanatory purposes, the example process 700 is described herein with reference to the ingress packet processor 206 of the example switch device 110 of FIGS. 2 and 3; however, the example process 700 is not limited to the ingress packet processor 206 of the example switch device 110 of FIGS. 2 and 3, and the example process 700 may be performed by one or more components of the example switch device 110. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The ingress packet processor 206 receives a stored SOP cell of a packet from the absorption buffer 204, or the ingress packet processor 206 may retrieve the SOP cell from the absorption buffer 204 (702). The ingress packet processor 206 performs ingress packet processing on the retrieved SOP cell (704). For example, the ingress packet processor 206 may make a forwarding decision based on the SOP cell, may generate metadata for routing the packet corresponding to the SOP cell to the appropriate egress port, and may attach the metadata to the SOP cell. In one or more implementations, the metadata may include the destination address of the packet, an egress port identifier, an egress queue identifier, or generally any other information that may be used for routing the packet. The ingress packet processor 206 passes the processed SOP cell and the generated metadata to the MMU 208 (706).

The ingress packet processor 206 receives stored EOP metadata for the packet from the absorption buffer 204, or the ingress packet processor 206 may retrieve the EOP metadata from the absorption buffer 204 (708). The ingress packet processor 206 performs ingress packet processing on the retrieved EOP metadata (710). For example, the ingress packet processor 206 may update flow meters and/or flow states based at least in part on the EOP metadata, e.g. packet length. The ingress packet processor 206 passes the processed EOP metadata to the MMU 208 (712). The ingress packet processor 206 then receives the next SOP cell from the absorption buffer 204 (702).

Figure 8:
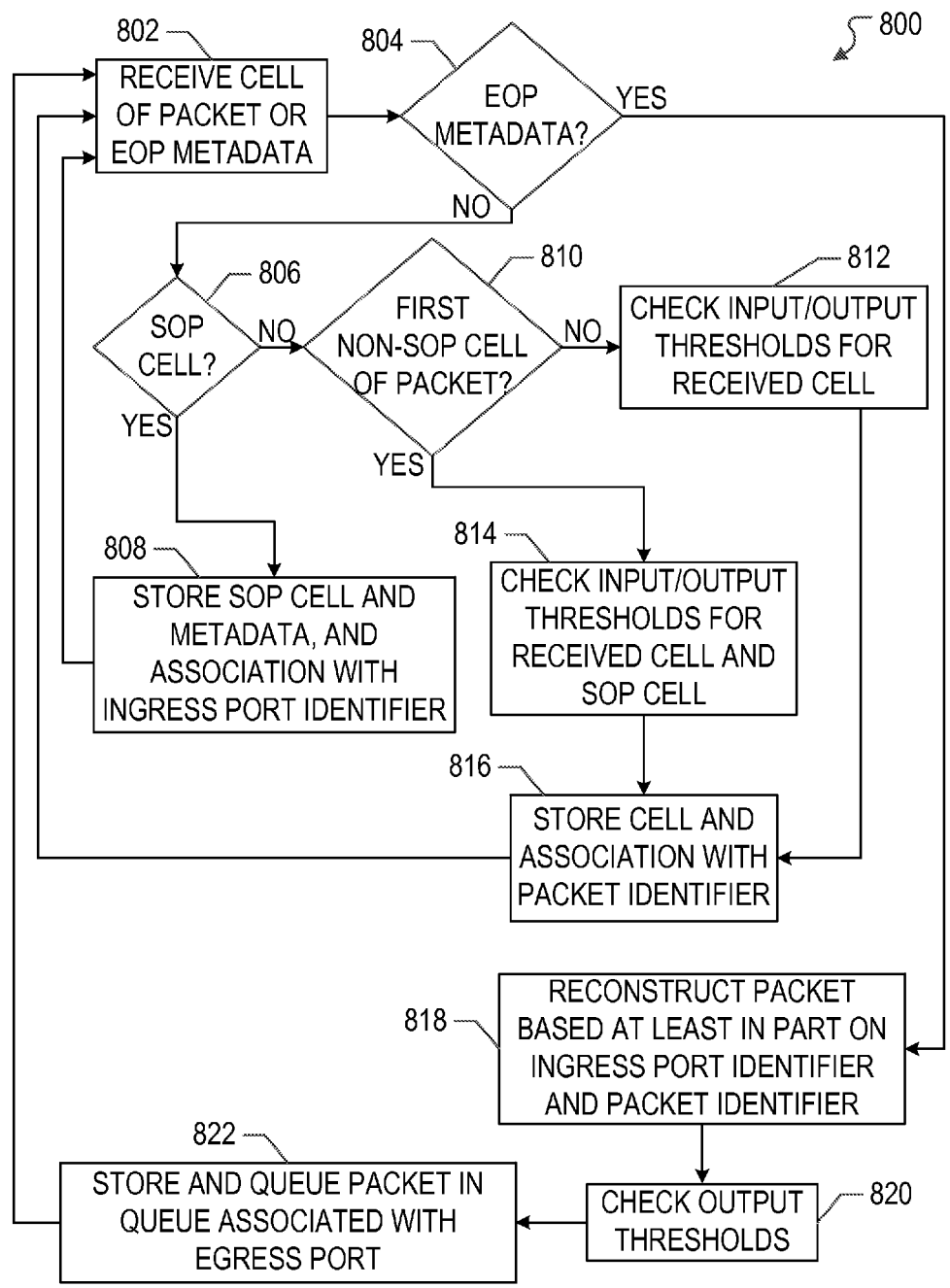
FIG. 8 illustrates a flow diagram of an example process of an example memory management unit (MMU) in a system for providing oversubscription of pipeline bandwidth in accordance with one or more implementations.

FIG. 8 illustrates a flow diagram of an example process of an example memory management unit (MMU) 208 in a system for providing oversubscription of pipeline bandwidth in accordance with one or more implementations. For explanatory purposes, the example process 800 is described herein with reference to the MMU 208 of the example switch device 110 of FIGS. 2 and 3; however, the example process 800 is not limited to the MMU 208 of the example switch device 110 of FIGS. 2 and 3, and the example process 800 may be performed by one or more components of the example switch device 110. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The MMU 208 receives a cell of packet or EOP metadata (802). For example, the MMU 208 may receive an MOP and/or EOP cell from the steer module 202 and/or the MMU 208 may receive a processed SOP cell and/or processed EOP metadata from the ingress packet processor 206. The MMU 208 determines whether the received data item is EOP metadata (804). If the MMU 208 determines that the received data item is not EOP metadata (804), the MMU 208 determines whether the received data item is an SOP cell (806). If the MMU 208 determines that the received data item is an SOP cell (806), the MMU 208 stores the SOP cell and in the main packet buffer 210 and stores an association between the SOP cell pointer, the metadata, and the ingress port identifier attached to the SOP cell, e.g. in the SOP data structure 504 (808). The MMU 208 then receives the next cell or EOP metadata (802).

If the MMU 208 determines that the received data item is not an SOP cell (806), the MMU 208 determines whether the received data item is a first non-SOP cell for a packet, e.g. based on the packet identifier attached to the cell (810). For example, the MMU 208 may determine whether any other cells have been received having the same packet identifier as the packet identifier attached to the cell. If the MMU 208 determines that the cell is the first non-SOP cell for the packet (810), the MMU 208 checks input thresholds for both the received cell and the SOP cell for the packet, e.g. to determine whether the cells can be stored in the main packet buffer 210, and the MMU 208 checks output thresholds for both the received cell and the SOP cell for the packet (814), e.g. to determine whether the oversubscription partition has sufficient space to account for storage of the cell and the SOP cell. If the main packet buffer 210 and/or the oversubscription partition cannot accommodate both the cell and the SOP cell, then the cell may be dropped.

If the MMU 208 determines that the cell is not the first non-SOP cell for the packet (810), the MMU 208 checks input thresholds for the received cell, e.g. to determine whether the cell can be stored in the main packet buffer 210, and the MMU 208 checks output thresholds for the received cell (812), e.g. to determine whether the oversubscription partition has sufficient space to account for storage of the cell. The MMU 208 stores the cell in the main packet buffer 210 and stores an association between the cell pointer and the packet identifier (816), e.g. in the MOP/EOP data structure 502. The MMU 208 then receives the next cell or EOP metadata (802).

If the MMU 208 determines that the received data item is EOP metadata (804), the MMU 208 reconstructs the packet based at least in part on the ingress port identifier and the packet identifier attached to the EOP cell (818). For example, the MMU 208 may retrieve the SOP cell pointer and metadata from the SOP data structure 504 based at least in part on the ingress port identifier attached to the EOP cell and the MMU 208 may retrieve the cell pointers of the MOP and/or EOP cells from the MOP/EOP data structure 502 based at least in part on packet identifier attached to the EOP cell. The MMU 208 may arrange the cells in the cell link data structure 506 to reconstruct the packet. In one or more implementations, upon reconstructing the packet, the MMU 208 may transmit an indication to the steer module 202 that the identifier for the packet can be reused.

The MMU 208 checks output thresholds (820), e.g. to determine if the main partition of the main packet buffer 210 can account for storage of the packet. If the main partition of the main packet buffer 210 cannot account for storage of the packet, the packet may be dropped. If the main partition of the main packet buffer 210 can account for storage of the packet, the packet is stored and queued in a queue associated with an egress port (822), such as a multicast queue and/or a unicast queue. Irrespective of the result of the output thresholds check, the MMU 208 releases space for the packet from the oversubscription partition. The MMU 208 then receives the next cell or EOP metadata (802).

Figure 9:
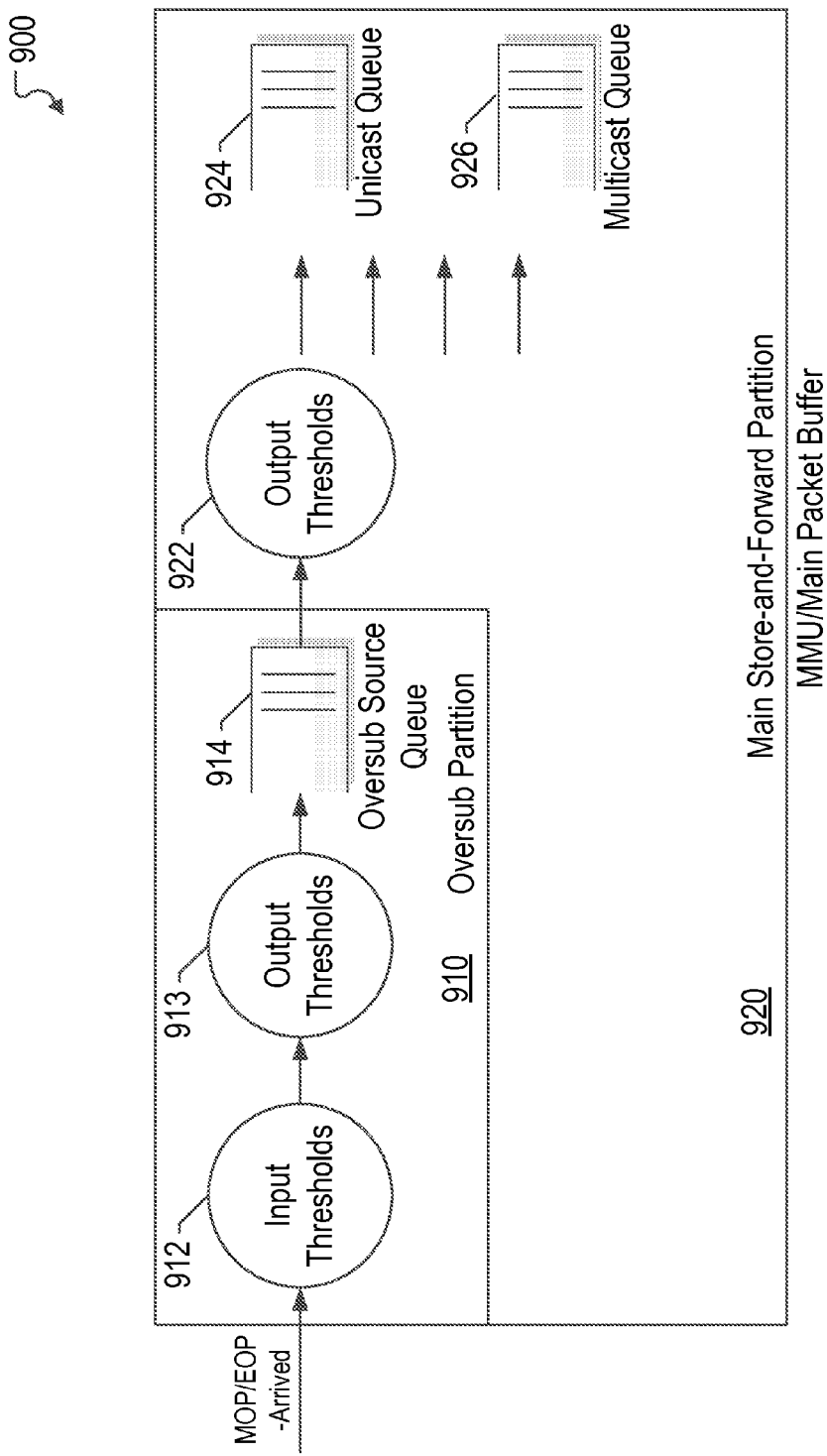
FIG. 9 illustrates a logical representation of an example MMU and example main packet buffer in a system for providing oversubscription of pipeline bandwidth in accordance with one or more implementations.

FIG. 9 illustrates a logical representation 900 of an example MMU and example main packet buffer in a system for providing oversubscription of pipeline bandwidth in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The logical representation 900, e.g. of the MMU 208 and the main packet buffer 210, includes an oversubscription partition 910 and a main partition 920. The oversubscription partition 910 includes an input thresholds check 912, an output thresholds check 913, and an oversubscription source queue 914. The main partition 920 includes an output thresholds check 922, a unicast queue 924, and a multicast queue 926. In operation, when an MOP-arrived event 304 and/or an EOP-arrived event 306 is triggered, the MMU 208 performs the input thresholds check 912 to determine if the main packet buffer 210 can account for the storage of the SOP, MOP and/or EOP cell in the main packet buffer 210. If the main packet buffer 210 can account for storage of the SOP, MOP, and/or EOP cell in the main packet buffer 210, the MMU 208 performs the output thresholds check 913 to determine if the oversubscription partition 910 can account for the storage of the SOP, MOP, and/or EOP cell. If the oversubscription partition 910 can account for the storage of the SOP, MOP, and/or EOP cell, the cell is queued in the oversubscription source queue 914.

When the cells are retrieved from the oversubscription source queue 914, e.g. when the EOP-processed event occurs, an output thresholds check 922 is performed for the packet with respect to the main partition of the main packet buffer 210, and the MMU 208 releases the space occupied by the cells of the packet in the oversubscription partition 910 irrespective of the result of the output thresholds check 922. If the main partition 920 of the main packet buffer 210 can account for the storage of the packet, the packet is queued in one or more queues associated with an egress port, such as a unicast queue 924 and/or a multicast queue 926 associated with an egress port.

By separating the input thresholds check 912 and the output thresholds check 922, an oversubscribed packet can be streamed into the main packet buffer 210 based on permission for the source port/priority to use resources, without regard to the destination(s). However, when the output thresholds check 922 occurs, the packet may be dropped, even though the resources had been held by the input thresholds check 912 for a period of time. This may be a result of not having both the source and destination information available at the time that the cells arrived at the main packet buffer 210. If a packet is dropped, the switch device 110 updates an internal state so that neither the input thresholds check 912 or the output thresholds check 922 account for any of the cells of the dropped packet.

In one or more implementations, in order to ensure lossless service, the maximum buffer size associated with the input thresholds check 912 may be configured such that, when exceeded, flow control results. In one or more implementations, the output thresholds check 922 may be configured in such a way that packets would typically not be dropped. In one or more implementations, the output thresholds check 922 may be bypassed based at least in part on the source port and/or priority. Thus, when the cells of a packet are accepted by the input thresholds check 912, the packet has been accepted into the main packet buffer 210 and will be transmitted. The input threshold check 912 may continue to reserve this buffer space until the packet's cells are de-queued.

The structure of the logical representation 900 may result in an efficient allocation of the main packet buffer 210 for lossless classes, may maintain service isolation, may isolate the oversubscription partition 910 from services associated with the main partition 920, and may allow configuration, e.g. user configuration, of the buffer space reserved to absorb oversubscribed packets, e.g. the amount of buffer space allocated to the oversubscription partition 910.

Figure 10:
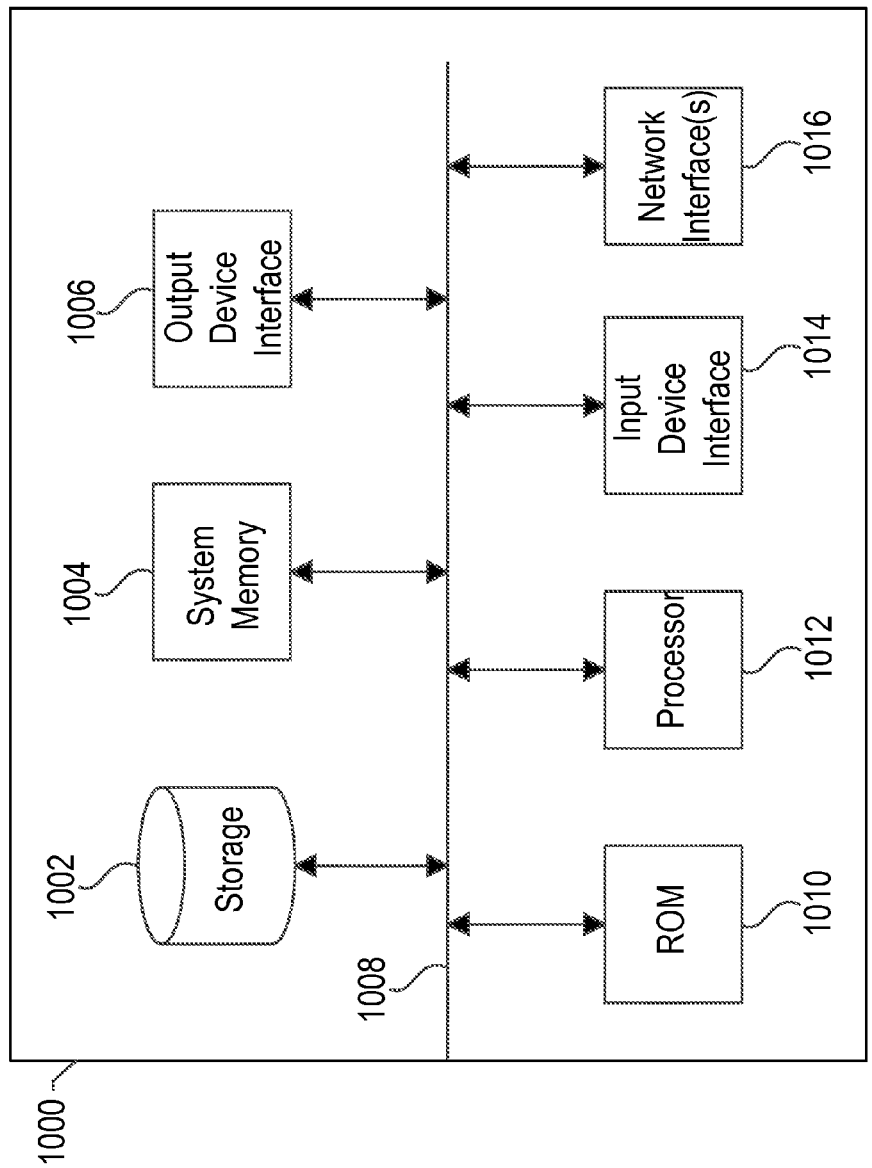
FIG. 10 conceptually illustrates an electronic system with which one or more implementations of the subject technology may be implemented.

FIG. 10 conceptually illustrates an electronic system 1000 with which one or more implementations of the subject technology may be implemented. The electronic system 1000, for example, can be a desktop computer, a laptop computer, a tablet computer, a server, a switch, a router, a base station, a receiver, a phone, a personal digital assistant (PDA), or generally any electronic device that transmits signals over a network. The electronic system 1000 can be, and/or can be a part of, the switch device 110, and/or one or more of the electronic devices 102, 104, 106. Such an electronic system includes various types of computer readable media and interfaces for various other types of computer readable media. The electronic system 1000 includes a bus 1008, one or more processing unit(s) 1012, a system memory or buffer 1004, a read-only memory (ROM) 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to a network (not shown) and/or to one or more network nodes, such as the electronic devices 102, 104, 106, through the one or more network interface(s) 1016. In this manner, the electronic system 1000 can be a part of a network of computers (such as a local area network ("LAN"), a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for providing oversubscription of pipeline bandwidth, the system comprising:
    a steer module configured to allocate packet identifiers for packets comprising cells received over ingress ports, each packet comprising a start of packet cell, at least one middle of packet cell, and an end of packet cell, to attach the packet identifier allocated for each respective packet to each cell of the respective packet, to pass middle of packet cells and end of packet cells to a memory management unit, and for a packet, to store the start of packet cell and end of packet metadata extracted from at least one of the cells of the packet in an absorption buffer;
    an ingress packet processor configured to, for the packet, retrieve the start of packet cell and the end of packet metadata from the absorption buffer, perform ingress packet processing on the start of packet cell and the end of packet metadata, and pass the processed start of packet cell and the end of packet metadata to the memory management unit; and
    the memory management unit configured to, for the packet, store the at least one middle of packet cell and the end of packet cell in a main packet buffer, allocate memory in the main packet buffer for the start of packet cell of the packet when the memory management unit receives a first middle of packet cell of the packet before the start of packet cell of the packet, store the processed start of packet cell in the main packet buffer, combine the processed start of packet cell, the at least one middle of packet cell, and the end of packet cell to reconstruct the packet based at least in part on the packet identifiers attached to the cells of the packet, queue the reconstructed packet in a queue associated with an egress port, account for storage of the processed start of packet cell of the packet, the at least one middle of packet cell of the packet, and the end of packet cell of the packet in the main packet buffer against a first partition of the main packet buffer, and account for storage of the reconstructed packet in the main packet buffer against a second partition of the main packet buffer,
    wherein the memory management unit reconstructs the packet upon receiving the end of packet metadata corresponding to the packet.

2. The system of claim 1, wherein the memory management unit is further configured to check input thresholds for the main packet buffer and check output thresholds for the first partition upon receiving, for the packet, the at least one middle of packet cell and the end of packet cell to determine whether the main packet buffer comprises memory space for the at least one middle of packet cell and the end of packet cell and to determine whether storage of the at least one middle of packet cell and the end of packet cell can be accounted against the first partition of the main packet buffer.

3. The system of claim 2, wherein the memory management unit is further configured to check the input thresholds for the main packet buffer and check the output thresholds for the first partition, upon receiving the first middle of packet cell of the packet, to determine whether the main packet buffer comprises space for the first middle of packet cell of the packet and the start of packet cell of the packet and to determine whether the first partition can account for storage of the first middle of packet cell of the packet and the start of packet cell of the packet.

4. The system of claim 3, wherein the memory management unit is further configured to check output thresholds for the second partition prior to queuing the reconstructed packet in the queue associated with the egress port.

5. The system of claim 1, wherein the memory management unit is further configured to generate an ordered association of the at least one middle of packet cell and the end of packet cell of the packet.

6. The system of claim 5, wherein the memory management unit is further configured to:
    receive the end of packet metadata of the packet, wherein the end of packet metadata comprises the packet identifier and an ingress port identifier;
    retrieve the ordered association of the at least one middle of packet cell and the end of packet cell of the packet based at least in part on the packet identifier of the end of packet metadata;
    retrieve the start of packet cell of the packet based at least in part on the ingress port identifier of the end of packet metadata; and
    reconstruct the packet based at least in part on the retrieved ordered association of the at least one middle of packet cell and the end of packet cell, and the retrieved start of packet cell.

7. The system of claim 1, wherein the steer module is further configured to allocate another packet identifier for another packet received over one of the ingress ports, the another packet comprising a start of packet cell, and an end of packet cell, and the another packet being exclusive of a middle of packet cell.

8. A method for providing oversubscription of pipeline bandwidth, the method comprising:
    associating a first portion of a packet and a remaining portion of the packet with an identifier of the packet;
    performing ingress packet processing on the first portion of the packet, wherein the remaining portion of the packet bypasses the ingress packet processing and is stored in a first partition of a main packet buffer;

allocating memory in the first partition and a second partition of the main packet buffer for the first portion of the packet when the remaining portion of the packet is received at the main packet buffer and stored in the first partition of the main packet buffer;

upon completing the ingress packet processing on the first portion of the packet, storing the processed first portion of the packet in the first partition of the main packet buffer; and reconstructing the packet by combining, based at least in part on the identifier of the packet, the processed first portion of the packet and the remaining portion of the packet from the first partition of the main packet buffer.

9. The method of claim 8, further comprising:
storing the reconstructed packet in the second partition of the main packet buffer, upon reconstructing the packet.

10. The method of claim 9, further comprising:
receiving the packet over an ingress port, wherein
prior to the ingress packet processing, the first portion of the packet is stored in an absorption buffer, and
wherein the storing of the remaining portion of the packet in the first partition of the main packet buffer occurs prior to the ingress packet processing.

11. The method of claim 10, further comprising:
accounting for storage of the reconstructed packet against the second partition of the main packet buffer.

12. The method of claim 11, wherein the first portion of the packet comprises a start of packet cell and end of packet metadata extracted from at least one cell of the packet and the remaining portion of the packet comprises at least a portion of an end of packet cell of the packet.

13. The method of claim 12, further comprising:
checking a threshold for the first partition of the main packet buffer upon receiving a first cell of the remaining portion of the packet to determine determine storage of the first cell of the remaining portion of the packet and storage of the start of packet cell of the first portion of the packet can be accounted against the first partition of the main packet buffer.

14. The method of claim 10, wherein the reconstructing the packet by combining, based at least in part on the identifier of the packet, the processed first portion of the packet and the remaining portion of the packet further comprises reconstructing the packet by combining, based at least in part on the identifier of the packet and an identifier of the ingress port, the processed first portion of the packet and the remaining portion of the packet.

15. The method of claim 10, wherein the ingress packet processing is performed by an ingress packet processor, the absorption buffer is located before the ingress packet processor in an ingress packet processing pipeline, and the main packet buffer is located after the ingress packet processor in the ingress packet processing pipeline.

16. The method of claim 8, wherein the first portion of the packet exclusively comprises a start of packet cell and the remaining portion of the packet exclusively comprises an end of packet cell.

17. The method of claim 8, wherein the remaining portion of the packet comprises at least one middle of packet cell and an end of packet cell.

18. The method of claim 17, further comprising:
generating an ordered association of the at least one middle of packet cell and the end of packet cell of the remaining portion of the packet.

19. A computer program product comprising instructions stored in a non-transitory computer-readable storage medium, the instructions comprising:
instructions to receive packets comprising cells over ingress ports, wherein the cells comprise start of packet cells, middle of packet cells, and end of packet cells;
instructions to attach a packet identifier of each respective packet to the cells of the respective packet;
instructions to store the middle of packet cells and the end of packet cells in a main packet buffer, and the start of packet cells and end of packet metadata extracted from at least one of the cells in an absorption buffer, wherein each end of packet metadata comprises the packet identifier attached to each of the end of packet cells;
instructions to allocate memory in the main packet buffer for the start of packet cell of each respective packet when a first cell of the respective packet is received at and stored in the main packet buffer;
instructions to perform ingress packet processing on the start of packet cells and the end of packet metadata, wherein the middle of packet cells and the end of packet cells bypass the ingress packet processing;
instructions to store each respective processed start of packet cell in the main packet buffer before reconstructing each respective packet;
instructions to reconstruct each respective packet, upon completing the ingress packet processing on the end of packet metadata of each respective packet, by combining, based at least in part on the packet identifier attached to the cells of each respective packet, the processed start of packet cell of each respective packet, the middle of packet cells of each respective packet, if any, and the end of packet cell of each respective packet;
instructions to store each of the reconstructed packets in the main packet buffer;
instructions to account for storage of the processed start of packet cells, the middle of packet cells and the end of packet cells in the main packet buffer against a first partition of the main packet buffer; and
instructions to account for storage of each of the reconstructed packets in the main packet buffer against a second partition of the main packet buffer.

20. The computer program product of claim 19, wherein at least one of the packets comprises a single-cell packet, and the instructions further comprising:
instructions to reconstruct the single-cell packet based at least in part on the single-cell of the packet.

* * * * *